July 2, 1935.  F. C. FRANK  2,006,448

BRAKE

Filed Sept. 5, 1930   3 Sheets-Sheet 1

INVENTOR.
FREDERICK C. FRANK
BY
M. W. McConkey
ATTORNEY

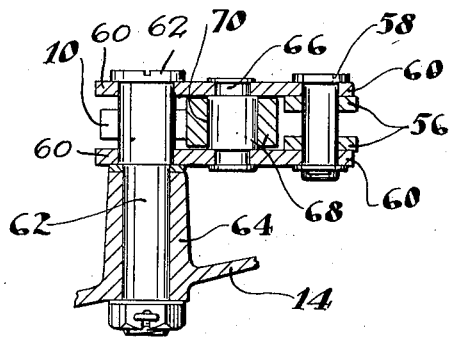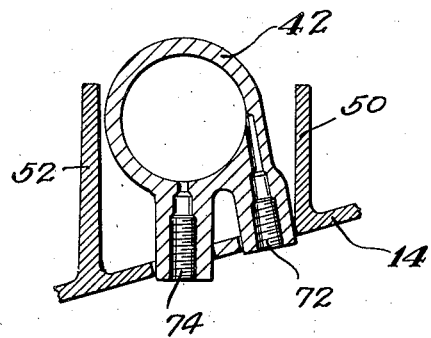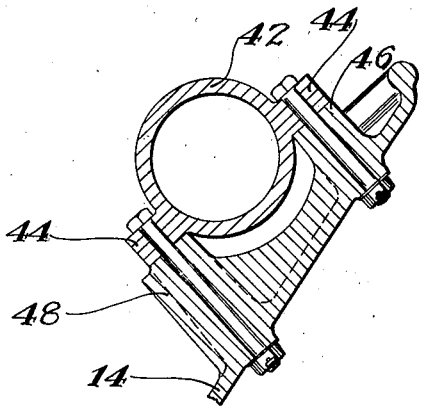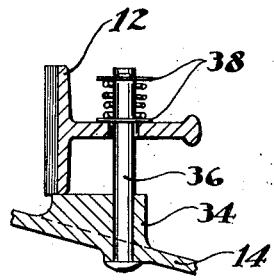

Patented July 2, 1935

2,006,448

UNITED STATES PATENT OFFICE 2,006,448

BRAKE

Frederick C. Frank, South Bend, Ind., assignor to Bendix Brake Company, South Bend, Ind., a corporation of Illinois Application September 5, 1930, Serial No. 479,891

3 Claims. (Cl. 188—152)

This invention relates to brakes and more particularly to an internal, expanding, hydraulically operated brake suitable for use on heavy automobiles and airplanes.

In providing braking mechanism for the massive conventional type of airplane and automobile, it is necessary that the structure be designed with a factor of safety, to withstand the rigors of normal service, wherein an unusual amount of energy is absorbed in the braking or decelerating of such vehicles. All parts of the brake must be rigidly constructed, furthermore, simplicity and facility of assembly and adjustment must be kept in mind in the design of such a brake.

To this end there is suggested the employment of a single anchor or one-way brake, the same to consist of two pivotally connected hydraulically operated internal expanding shoes.

In the interests of effective operation and simplicity of structure there is suggested a fluid operated motor, rigidly mounted in an integral cradle portion of the torque or brake support plate, the piston element of the motor being arranged to operate the floating or servo shoe of the brake through the intermediary of a force multiplying lever member.

Figure 1:
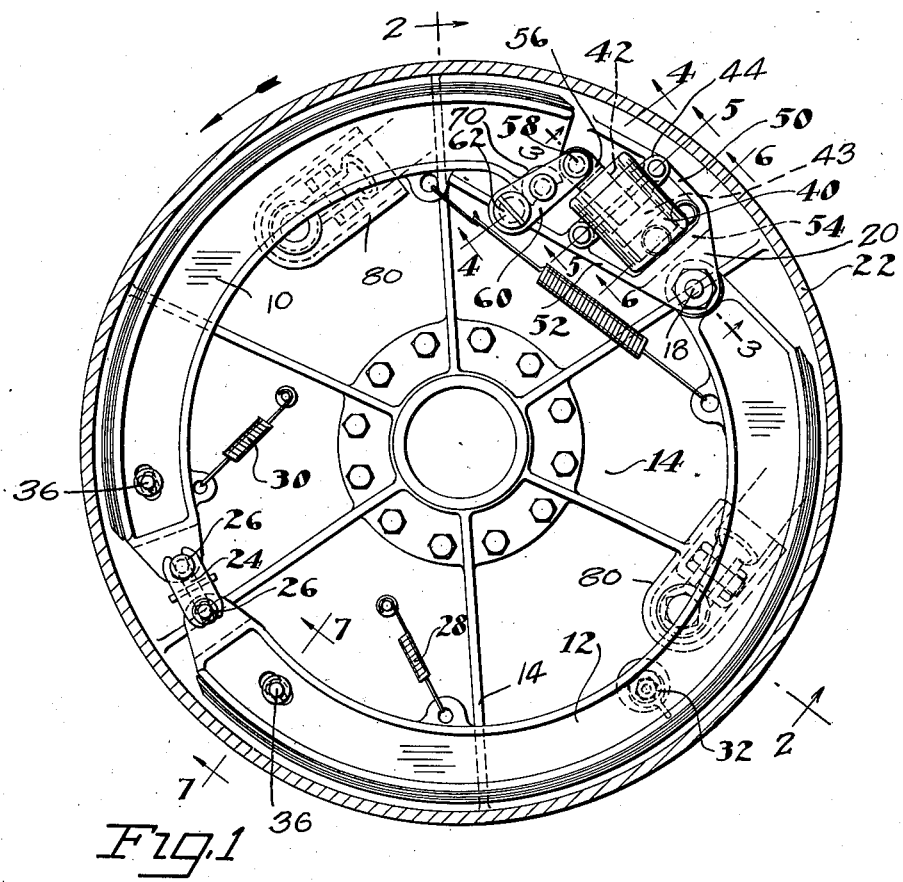
Figure 3:
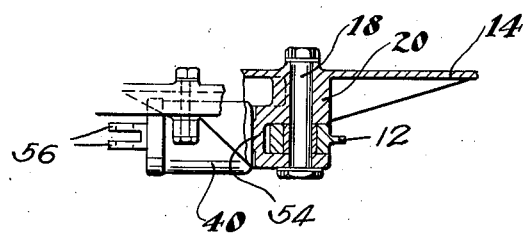
Figure 2:
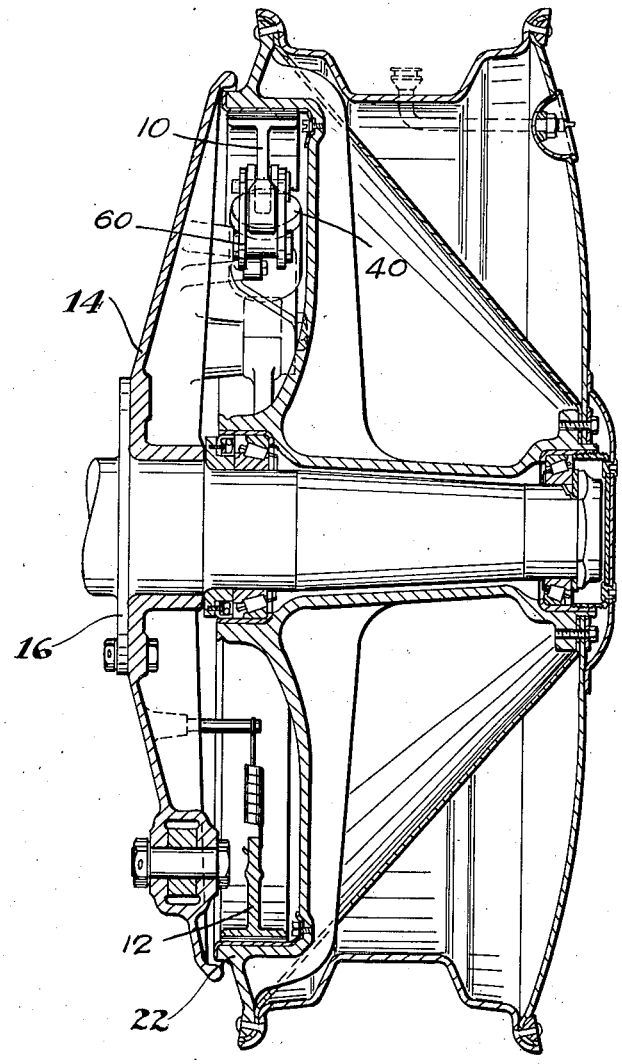

Further objects and features of the invention including a novel one-piece combined applying means and anchor mounting as well as other details of construction and combinations of parts will become apparent from the following description, taken in conjunction with the accompanying drawings, in which:

Figure 1 is a side elevation of the brake structure shown mounted on its torque or support plate, Figure 2 is a transverse section through my novel brake structure together with the wheel structure associated therewith, Figure 3 is a fragmentary view disclosing partly in plan and partly in section the fluid motor and anchor pins and the mounting structure therefor, Figure 4 is a section on line 4—4 of Figure 1 disclosing in detail the lever mechanism, Figure 5 is a section on line 5—5 of Figure 1 disclosing a portion of the mounting of the fluid motor, Figure 6 is a section on line 6—6 of Figure 1 also disclosing the fluid motor and a portion of its mounting, the fluid ports of the motor being disclosed in detail, and Figure 7 is a section taken on line 7—7 of Figure 1 disclosing the guide and support structure for the brake shoes.

In that embodiment of the invention selected for illustration and disclosed in detail in Figure 1, there is provided an internal expanding brake comprising two adjustably connected T section friction faced brake shoes 10 and 12 mounted upon a cone shaped torque or backing plate 14, the latter rigidly connected to the flange 16 of the axle structure of the wheel. The wheel structure forms no part of this invention being very similar to that disclosed and described in my co-pending application Serial Number 461,336 filed June 16, 1930.

Brake shoe 12 is preferably pivotally secured at its upper end to an anchor pin 18 mounted within a laterally extending boss 20 integral with the brake support or backing plate 14 and recessed to receive the end of the shoe. The brake disclosed is mounted on the left wheel of an airplane, the normal direction of rotation of the brake drum 22 being counterclockwise as indicated by the arrow in Figure 1. The anchor pin 18 therefore serves to take the braking reaction from both brakeshoes when the latter are moved into drum contact by my novel fluid operating mechanism to be described hereafter.

The brake shoes are adjustably connected by a right and left threaded bolt member 24 threadedly receiving at its ends a pair of cylindrical housings through which extend pins 26, the latter being rotatably mounted in and supported by adjacent bifurcated ends of the brake shoe in a manner similar to that disclosed and described in my co-pending application Serial Number 461,341, filed June 16, 1930. Springs 28 and 30 are secured to the plate 14 and to lugs on the shoes 12 and 10 respectively to draw the latter away from the brake drum upon release of the applying mechanism, the position of the connected shoes being determined by an adjustable eccentric stop member 32. The stop member 32 comprises a stub shaft rotatably mounted on the backing plate and carrying at one end an eccentrically mounted disc adapted to contact with the inside of the associated brake shoe when in its released position. Rotation of the shaft (because of the eccentricity of the mounting of the disc) therefore adjusts the released position to which the shoes may be moved by the spring.

As disclosed in Figures 1 and 7 the inoperative position of the brake shoes as well as their path of movement during the braking operation is determined by a plane faced boss 34 protruding from and integral with the brake support plate cooperating with a structure comprising a pin 36 extending from the boss, said pin extending through oversized openings in the shoes and provided with spring pressed washers 38 forcing the rim of the shoes laterally into contact with the boss. The boss therefore serves the double function of a guide and support for the shoe as well as a mounting for the pin 36.

According to an important feature of my invention the two shoes of the brake are forced into drum engagement by a fluid operated motor 40 comprising a cylinder 42 and piston 43. The cylinder is preferably provided with laterally extending integral flanges 44 which flanges are bolted rigidly to bosses 46 and 48 (Figure 5) extending from the backing plate. The latter bosses form a portion of a novel cradle support or mounting comprising upper and lower flanges 50 and 52 which flanges are connected by an end flange 54 forming an integral part of or extension of the boss 20 supporting the anchor pin 18. The flanges 50, 52 and 54 and boss 20 together constitute a combined one-piece mounting for the anchor pin and brake applying means, the flange and the boss being integral with the brake support plate.

The piston rod 56 of the motor is preferably cleviced at its end as disclosed in Figure 4 to receive a pin 58 the latter mounted within one end of parallel plates 60 constituting together a lever member for actuation of the primary brake shoe 10. The plates 60 are pivotally mounted at their other ends on a pin 62 mounted within a boss 64 extending from the brake support plate. Intermediate the ends of the lever plates there is provided a pin 66 rotatably supporting a roller thrust member 68 the latter nesting within a concave recess 70 at the end of the web of the primary or servo shoe 10 of the brake.

It is to be noted that in applying the brakes the roller 68 which nests in the concave recess 70 is moved by the lever formed by the plates 60 in an arc having a component moving radially outward of said drum.

In operation the fluid of the motor, which fluid is admitted to the cylinder through ports 72 and 74 (Figure 6) moves piston rod 56 outwardly rocking the lever about its fulcrum pin 62 thrusting, through the intermediary of the roller 68, the shoe 10 into engagement with the drum. The wiping action of the rotating drum forces the shoe 10 around the drum and with it the shoe 12, the two shoes being thus firmly and forcibly thrust into engagement with the rotating drum.

The torque or reaction of the brake shoes is taken by pin 18 which is adequately supported by the cradle structure heretofore described together with the end of the fluid motor which abuts the flange 54, all of which parts are all rigidly secured to the backing plate and combine to form a very rigid mounting to take the excessive braking thrusts imposed upon the pin 18. The cradle structure thus performs the dual function of rigidly mounting and supporting the fluid motor as well as reinforcing the anchor pin boss 20 of the brake.

The applying force of the motor is stepped up through the intermediary of the power multiplying lever thus insuring a very effective and forceful application of the braking members. Upon demounting the wheel structure of Figure 2 access is had to the braking mechanism which is readily serviced by virtue of the relatively few compact and simple parts described and disclosed. Wear of the friction lining on the brake shoes is compensated for by rotation of the nut 24 forcing the shoes apart to increase the overall length thereof. There is thus provided a very simple and substantially fool proof brake structure, rugged in construction and fully capable of the heavy duty imposed upon it.

While I have illustrated and described somewhat in detail one embodiment of my invention, it is not my intention to limit the scope of the invention to this particular embodiment or otherwise than by the terms of the appended claims.

I claim:

1. A brake mechanism comprising a rotatable drum, friction means within the drum including pivotally connected shoes anchored at one end of one of said shoes, together with applying means for said shoes comprising a fluid motor positioned adjacent said anchored end and force multiplying means connecting said motor with said friction means, one of said shoes having a concave recess and said force multiplying means comprising a pivoted lever, a roller carried by the lever and seated in said recess and moving in applying the shoes in an arc having a component moving radially outward of said drum.

2. Brake mechanism including applying and anchoring means, together with a support plate characterized by having formed integral therewith a one piece mounting for the applying means and anchor means, said mounting comprising a boss through which the anchoring means extends and a plurality of flanges forming a cradle in which the applying means is secured.

3. A brake structure including a support plate provided with integral bosses projecting laterally therefrom and with a plurality of integral flanges forming a cradle together with a fluid motor having laterally projecting flanges secured within said cradle and to said bosses.

FREDERICK C. FRANK.